(12) United States Patent
Baig et al.

(10) Patent No.: US 10,552,076 B2
(45) Date of Patent: Feb. 4, 2020

(54) IDENTIFICATION OF VOLUMES FOR THIN PROVISIONING

(71) Applicant: International Business Machines Corporation, Armonk, NY (US)

(72) Inventors: Mirza S. Baig, Grand Prairie, TX (US); Paul Lawrence Bradshaw, Santa Cruz, CA (US); Divyesh Jadav, San Jose, CA (US); Bryan Steward Langston, Herriman, UT (US); Nagapramod S. Mandagere, San Jose, CA (US); Aameek Singh, University Place, WA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 199 days.

(21) Appl. No.: 15/377,614

(22) Filed: Dec. 13, 2016

(65) Prior Publication Data

US 2018/0165033 A1    Jun. 14, 2018

(51) Int. Cl.
*G06F 3/06* (2006.01)

(52) U.S. Cl.
CPC ............ *G06F 3/0644* (2013.01); *G06F 3/061* (2013.01); *G06F 3/0608* (2013.01); *G06F 3/0631* (2013.01); *G06F 3/0673* (2013.01)

(58) Field of Classification Search
CPC .......... G06F 12/00; G06F 12/08; G06F 13/00; G06F 3/06; G06F 3/0644; G06F 3/0608; G06F 3/061; G06F 3/0673; G06F 3/0631
(Continued)

(56) References Cited

U.S. PATENT DOCUMENTS

| | | | |
|---|---|---|---|
| 8,429,373 B2 | 4/2013 | Acedo et al. | |
| 8,656,096 B2 | 2/2014 | Acedo et al. | |

(Continued)

FOREIGN PATENT DOCUMENTS

| | | |
|---|---|---|
| WO | WO2013023090 A2 | 2/2013 |
| WO | WO2013118194 A1 | 8/2013 |

OTHER PUBLICATIONS

Larry Coyne et al., "IBM Smart Storage Cloud", Redpaper, International Technical Support Organization, Nov. 2012, 116 pages, available at : www.ibm.com/redbooks, IBM.

(Continued)

*Primary Examiner* — Tuan V Thai
(74) *Attorney, Agent, or Firm* — Ference & Associates LLC (57) ABSTRACT

One embodiment provides a method, including: generating, for each of a plurality of storage volumes, an actual used storage capacity model and identifying a potential storage capacity savings using the actual used capacity model, wherein each of the plurality of storage volumes has been identified as a candidate for migration to a thin provisioned volume; generating, for each of the plurality of storage volumes, an input/output profile model and identifying a potential change in performance of an application accessing the storage volume using the input/output profile model; generating, for each of the plurality of storage volumes, a growth profile and identifying a potential change in capacity using the growth profile; and determining, using an optimization algorithm, a subset of the plurality of storage volumes to be migrated to thin provisioned volumes based upon the volume capacity model, the performance model, and the volume growth profile.

18 Claims, 3 Drawing Sheets

(58) Field of Classification Search
USPC .............. 711/100, 103, 117, 118, 154, 200
See application file for complete search history.

(56) References Cited

U.S. PATENT DOCUMENTS

| | | |
|---|---|---|
| 9,182,926 B2 | 11/2015 | Naganuma et al. |
| 2007/0174574 A1 | 7/2007 | Kano |
| 2011/0191563 A1* | 8/2011 | Acedo .................. G06F 3/0605 711/166 |
| 2011/0231580 A1 | 9/2011 | Nakamichi et al. |
| 2012/0260055 A1 | 10/2012 | Murase et al. |
| 2014/0019706 A1* | 1/2014 | Kanfi .................... G06F 16/122 711/171 |
| 2014/0089921 A1* | 3/2014 | Yang ................... G06F 9/45558 718/1 |
| 2015/0234618 A1 | 8/2015 | Miwa et al. |
| 2016/0062701 A1* | 3/2016 | Patil ..................... G06F 3/0653 711/156 |
| 2017/0300243 A1* | 10/2017 | Diel ........................ G06F 3/065 |
| 2018/0052621 A1* | 2/2018 | Diel ........................ G06F 3/067 |

OTHER PUBLICATIONS

Karen Orlando et al., "N series Thin Provisioning", Redpaper, International Technical Support Organization, 2011, 30 pages, available at : www.ibm.com/redbooks, IBM.

Bertrand Dufrasne et al., "IBM XIV Storage System Thin Provisioning and Space Reclamation", Redpaper, International Technical Support Organization, Jun. 2013, 62 pages, available at : www.ibm.com/redbooks, IBM.

Hitachi, "Hitachi Dynamic Provisioning Software: Advanced Thin Provisioning", Datasheet, Hitachi Storage Solutions, Apr. 2010, 2 pages, Hitachi Data Systems Corporation.

Paul Manning, "Dynamic Storage Provisioning—Considerations and Best Practices for Using Virtual Disk Thin Provisioning", White Paper, 2009, 11 pages, VMware, Inc., Palo Alto, CA, USA.

* cited by examiner

IDENTIFICATION OF VOLUMES FOR THIN PROVISIONING

BACKGROUND

Many companies or individuals may store information on a centralized disk-storage system, storage area network (SAN), storage virtualization system, or the like. Such systems provide an information storage location that allows access by multiple users, applications, systems, and the like. The storage space on the storage systems may be divided and each division may be allocated to different applications or users. For example, a company may have a single storage drive or server that has been divided into multiple different storage drives or volumes. Users may have access to only a single storage drive, for example, as a user-specific work drive where the user stores files and folders unique to that user. Similarly, the drives may be divided into multiple volumes which are then allocated to one or more applications. The application(s) may access the designated volume when performing access operations of the application.

BRIEF SUMMARY

In summary, one aspect of the invention provides a method, comprising: utilizing at least one processor to execute computer code that performs the steps of: obtaining a plurality of storage volumes, wherein each of the plurality of storage volumes has been identified as a candidate for transition to a thin provisioned volume; for each of the plurality of storage volumes, identifying a benefit associated with transitioning the volume to a thin provisioned volume; the identifying a benefit for each of the plurality of storage volumes, comprising: determining potential volume storage savings, wherein the potential volume storage savings identifies the amount of storage capacity that could be saved if the volume were transitioned to a thin provisioned volume; identifying an application performance impact, wherein the application performance impact identifies an impact to the performance of an application if the volume the application accesses is transitioned to a thin provisioned volume; generating a volume growth profile, wherein the volume growth profile identifies a projected volume capacity usage for a future predetermined time frame; and identifying, based upon the identified benefit associated with each of the plurality of storage volumes, a subset of the plurality of storage volumes to be transitioned to thin provisioned volumes.

Another aspect of the invention provides an apparatus, comprising: at least one processor; and a computer readable storage medium having computer readable program code embodied therewith and executable by the at least one processor, the computer readable program code comprising: computer readable program code that obtains a plurality of storage volumes, wherein each of the plurality of storage volumes has been identified as a candidate for transition to a thin provisioned volume; for each of the plurality of storage volumes, computer readable program code that identifies a benefit associated with transitioning the volume to a thin provisioned volume; the identifying a benefit for each of the plurality of storage volumes, comprising: determining potential volume storage savings, wherein the potential volume storage savings identifies the amount of storage capacity that could be saved if the volume were transitioned to a thin provisioned volume; identifying an application performance impact, wherein the application performance impact identifies an impact to the performance of an application if the volume the application accesses is transitioned to a thin provisioned volume; generating a volume growth profile, wherein the volume growth profile identifies a projected volume capacity usage for a future predetermined time frame; and computer readable program code that identifies, based upon the identified benefit associated with each of the plurality of storage volumes, a subset of the plurality of storage volumes to be transitioned to thin provisioned volumes.

An additional aspect of the invention provides a computer program product, comprising: a computer readable storage medium having computer readable program code embodied therewith, the computer readable program code executable by a processor and comprising: computer readable program code that obtains a plurality of storage volumes, wherein each of the plurality of storage volumes has been identified as a candidate for transition to a thin provisioned volume; for each of the plurality of storage volumes, computer readable program code that identifies a benefit associated with transitioning the volume to a thin provisioned volume; the identifying a benefit for each of the plurality of storage volumes, comprising: determining potential volume storage savings, wherein the potential volume storage savings identifies the amount of storage capacity that could be saved if the volume were transitioned to a thin provisioned volume; identifying an application performance impact, wherein the application performance impact identifies an impact to the performance of an application if the volume the application accesses is transitioned to a thin provisioned volume; generating a volume growth profile, wherein the volume growth profile identifies a projected volume capacity usage for a future predetermined time frame; and computer readable program code that identifies, based upon the identified benefit associated with each of the plurality of storage volumes, a subset of the plurality of storage volumes to be transitioned to thin provisioned volumes A further aspect of the invention provides a method, comprising: utilizing at least one processor to execute computer code that performs the steps of: generating, for each of a plurality of storage volumes, an actual used storage capacity model and identifying a potential storage capacity savings using the actual used capacity model, wherein each of the plurality of storage volumes has been identified as a candidate for migration to a thin provisioned volume; generating, for each of the plurality of storage volumes, an input/output profile model and identifying a potential change in performance of an application accessing the storage volume using the input/output profile model; generating, for each of the plurality of storage volumes, a growth profile and identifying a potential change in capacity using the growth profile; and determining, using an optimization algorithm, a subset of the plurality of storage volumes to be migrated to thin provisioned volumes based upon the volume capacity model, the performance model, and the volume growth profile.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Typically the allocation of storage drives or disks is based upon a predefined storage capacity. For example, all the employees of a company may each have a user-specific drive that has a capacity of 1 gigabyte (GB). Such storage provisioning is referred to as thick provisioning. Thick provisioning is a type of storage allocation in which the amount of storage capacity on a disk is pre-allocated and the storage capacity remains constant as the storage volume is accessed and used. One problem with a thick provisioning approach is that not all users or applications accessing the storage volume may use or need the same amount of storage capacity. For example, one employee may only use half of the 1 gigabyte capacity, while another employee could easily use 2 gigabytes of storage capacity. Similarly, one application which accesses a storage volume may only use a quarter of the storage capacity. Thus, much of the storage capacity may go unused and wasted. However, because the storage allocation is pre-allocated in a thick provisioning environment, there is not a method to reallocate the storage capacities based upon the capacity actually used.

To help combat the problem with wasted storage capacity in a thick provisioned environment, a thin provisioned environment has been created. Thin provisioning allows storage allocation to occur as a system, application, user, or the like, needs or requests the storage space. Thus, when an application writes information to the storage volume, the capacity of the storage volume may be increased to account for the increase in information stored on the volume. One problem with a thin provisioned environment is that the access time to the volume is a little slower because the storage space has to be dynamically modified. Additionally, the management of a thin-provisioned environment may be more difficult because the hardware to support the thin-provisioned volume must meet or exceed the amount of thin provisioned volumes. For example, if the storage space that is allocated to thin provisioned volumes matches the amount of hardware storage, when an application needs more storage capacity the system will be unable to meet the need. Thus, thin provisioned environments may not be best suited for every application, system, user, or the like.

An issue many companies or individuals face is whether volumes should be transitioned from a thick provisioned volume to a thin provisioned or hybrid volume. In a hybrid environment some volumes may be thick provisioned and some volumes on the same system may be thin provisioned. For ease of understanding, the term thin provisioned will be used throughout this disclosure. However, it should be understood that the entire volume, disk, system, or the like, does not have to be transitioned or allocated as a thin provisioned environment. The systems and methods as described herein can also be applied to identifying volumes to be transitioned to a hybrid environment. Determining whether it would be useful and beneficial to move a particular volume to a thin provisioned or hybrid environment can be very difficult for an entity. Current methods for making the determination of whether such a transition would be beneficial include actually making the conversion and then comparing how much storage space was used before the transition to how much storage space is used after the transition. Such a transition can take hours, days, months, or even years. Additionally, the transition has to be completed on each volume. The traditional techniques consider the total virtual capacity of each volume while performing a bin packing approach with predetermined over-commit ratios.

One problem, other than the length of time for completing the transition, is that such an approach fails to take into account the real used capacity of the volumes. Thus, if the real used capacity of the volume is close to the allocated capacity of the volume, the benefit of transitioning this volume to a thin provisioned volume is reduced. Additionally, if the real used capacity of the volume fluctuates greatly from time period to time period (e.g., over a ninety day time period, over a year period, etc.), the benefit of transitioning such a volume to a thin provisioned volume may be reduced due to the fluctuations in storage capacity requirements. Another problem is that because thin provisioned volumes may have performance impacts, some volumes may not be good candidates for thin provisioning because the impact to the performance of applications accessing the volume may be too severe.

Accordingly, an embodiment provides a method of identifying volumes to be transitioned to thin provisioned volumes. An embodiment may obtain a selection of storage volumes which have each been identified as candidates for transition to a thin provisioned volume. The system may then identify a benefit, for each candidate volume, associated with transitioning the volume to a thin provisioned volume. In one embodiment, the benefit may also be based upon an application performance impact which identifies an impact to the performance of an application which accesses the volume if the volume were transitioned to a thin provisioned volume. An embodiment may identify the application performance impact by generating an input/output (I/O) profile model of the volume. The I/O profile model may be based upon prior performance history or intelligent sampling. An embodiment may also identify sparseness and cache characteristics of the volume.

In one embodiment, the benefit may be identified through determining a potential volume storage savings which identifies an amount of storage capacity that could be saved if the volume is transitioned to a thin provisioned volume. To identify the potential volume storage savings, an embodiment may first identify the real used capacity of the candidate volume using a multi-level introspection technique. Based upon the real used capacity, an embodiment may compare the real used capacity to the total currently allocated storage capacity. An embodiment may then identify the storage capacity savings if the volume was transitioned to a thin provisioned volume. In an embodiment, the benefit may also be based upon a volume growth profile which may identify a projected capacity growth of the volume over a predetermined time frame. An embodiment may use historical snapshotting of the volume to determine a growth profile.

Based upon the identified benefit, an embodiment may identify a subset of the volumes to be transitioned to thin provisioned volumes. This subset may be identified by the system as the volumes which would provide the greatest benefit in use of the storage space to a company or individual. The identification of the subset may be accomplished using an optimization algorithm, for example, a stochastic programming algorithm. One embodiment may assign different scores to each of the volumes. For example, an embodiment may assign, to each of the candidates, a volume savings score based upon the potential volume storage savings, a suitability score based upon the application performance impact, and/or a risk score based upon the volume growth profile. In one embodiment, the optimization algorithm may be run on the assigned scores to generate an optimized list of volumes. Alternatively, the candidate volumes may be ranked by the assigned scores and the top-ranking volumes may be selected as the subset. An embodiment may then provide a recommendation to a user regarding which volumes should be chosen to be transitioned to thin volumes. Thus, an embodiment provides a guided approach to identify which volumes should be transitioned to thin provisioned volumes using heuristics or models.

Such a system provides a technical improvement over current systems for storage allocation and identification of volumes to be chosen for one storage allocation environment or another. The systems and methods as described herein assist in identifying a subset of volumes that may result in a more efficient or an optimized use of storage space. The system identifies a benefit for each of the candidate volumes which would result from transitioning the volume to a thin provisioned volume. Identification of the benefit is based upon an identification of the real used capacity of the volume, a probabilistic growth profile for the volume, and an application performance impact. Thus, rather than traditional techniques which fail to take into consideration any of these factors, the system as described herein is able to identify a subset of volumes which may provide the greatest storage capacity efficiency and optimization for a company when transitioned to thin provisioned volumes. Additionally, the techniques as described herein do not require that the volume be first transitioned to identify the storage capacity savings. Thus, the techniques provide a system that requires much less time, overhead, and processing to make a guided recommendation for transitioning volumes.

Figure 1:
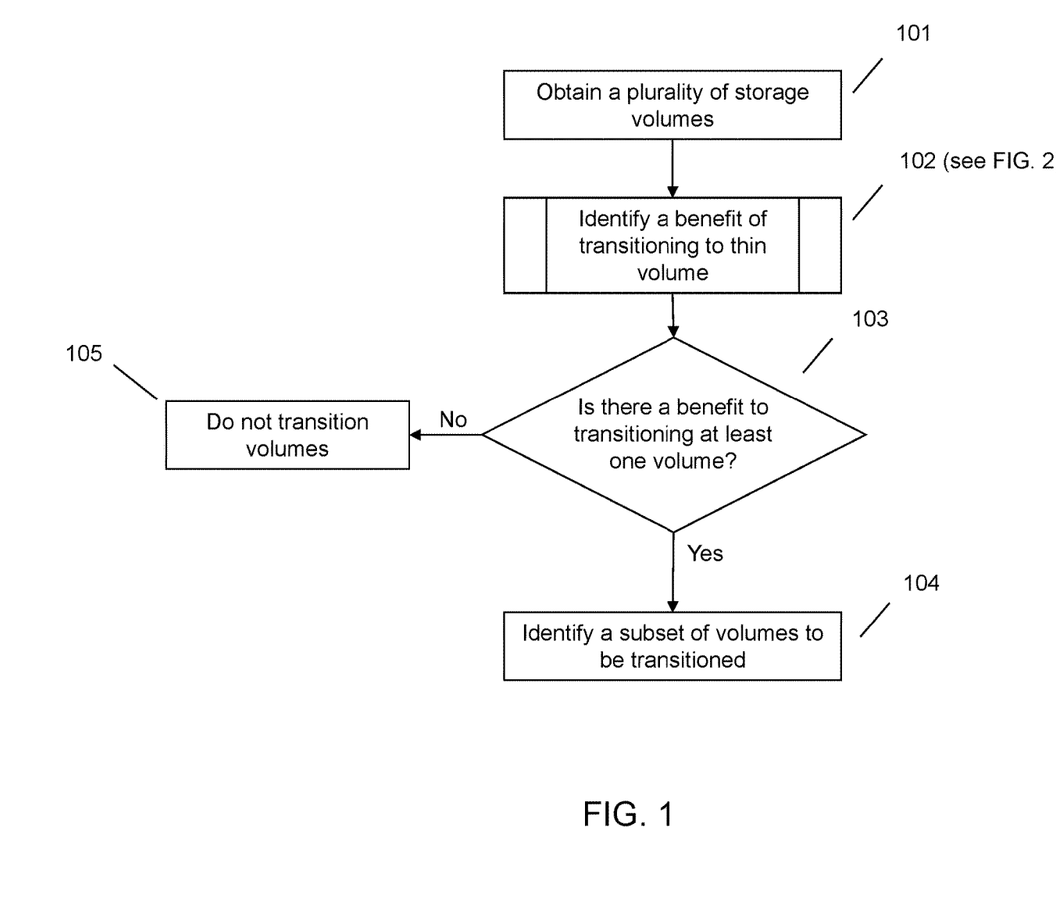
FIG. 1 illustrates a method of identifying volumes for thin provisioning.
Figure 2:
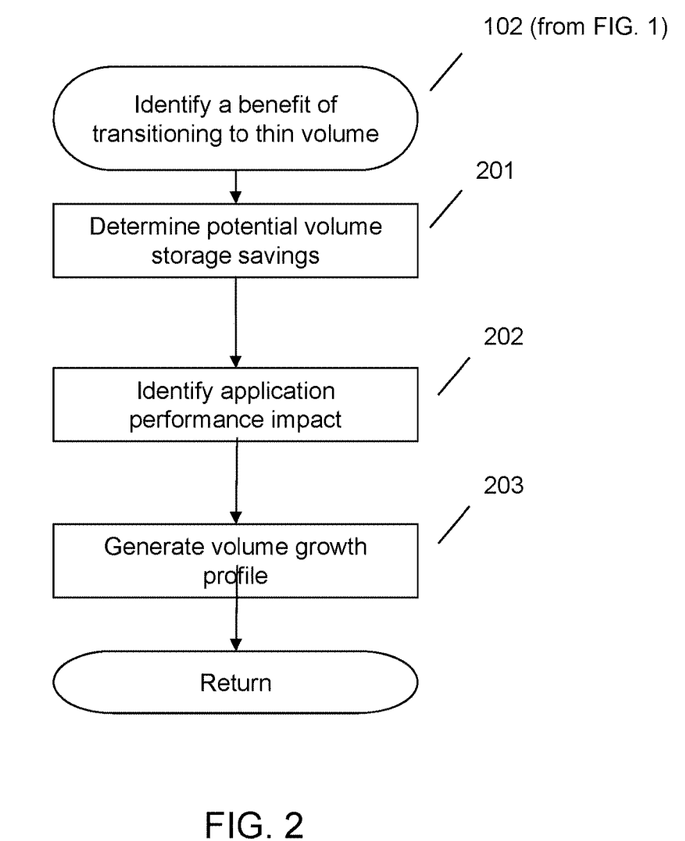
FIG. 2 illustrates a method for identifying a benefit of transitioning to a thin provisioned volume.

Referring now to FIG. 1, at 101 an embodiment may obtain a selection of a plurality of storage volumes. Each of the storage volumes may have been identified as a candidate for transitioning to a thin provisioned volume. The selection of storage volumes may be identified by a user as candidates for transitioning to thin provisioned volumes. For example, a user may mark or denote particular volumes within a system as candidates for transitioning to thin provisioned volumes. Alternatively, the system may identify the selection of storage volumes. For example, the system may identify a system storage location in which the allocated storage capacity is close to the total possible storage capacity of the hardware resource. The system may identify the volumes at this storage location as possible candidates for thin provisioning in order to reduce the allocated storage capacity.

At 102, an embodiment may identify a benefit associated with transitioning each of the candidate volumes to thin provisioned volumes. In identifying the benefit of transitioning a volume, an embodiment may build different models or complete different estimations, for example, as described in FIG. 2. It should be understood that the steps as described in FIG. 2 do not have to be completed in the order described in FIG. 2. For example, the step at 202 could be completed before the step at 201. To build the models, an embodiment may receive different inputs. One input may include a storage volume capacity report which identifies or includes volume capacity statistics that provide information about the total allocated capacity of each volume. For example, if the volumes are thick provisioned volumes, the storage volume capacity report may identify how much storage capacity has been allocated to each volume. Another input may include virtual machine (VM) capacity reports. Virtual infrastructures include their own storage abstractions on top of the storage volumes. Thus, the VM capacity report may identify the capacity occupied by a virtual machine within a storage volume. Other inputs may include a file system capacity report which may identify the storage space occupied by user data on a virtual machine, an end-to-end topology which may identify the system layout across multiple layers of a storage stack, historical performance reports which may identify the historical performance of an application, and the like.

At 201, an embodiment may determine a potential volume storage savings. The volume storage savings may identify an amount of storage capacity that could be saved if the volume were transitioned to a thin provisioned volume. To determine the potential volume storage savings, an embodiment may first identify the currently used or real used capacity of the volume. The currently used or real used capacity may identify how much capacity of the storage volume is actually used. For example, a storage volume may have an allocated volume capacity of 500 megabytes (MB); however, the real used capacity may only be 250 MB. Storage volumes typically contain multiple layers or abstractions, particularly when the storage volumes are divided into virtual machines. For example, a storage volume may contain a three layer stack with multiple virtual machines on a hypervisor which accesses external storage. Each of the layers or abstractions may have different allocated and used storage capacities. Additionally, the information stored with the layers may partially overlap between layers because information may get deleted from a layer and the deletion does not get passed to the other layers. Accordingly, by looking at a single layer, a volume may appear to offer more storage capacity savings than a different volume. However, if all the layers are analyzed, the second volume may actually offer more storage capacity savings. Thus, to identify the real used capacity of a storage volume an embodiment may use a multi-level introspection approach.

The multi-level introspection approach may include using capacity statistics reported by layers of the stack. The capacity statistics may be obtained by accessing each layer that accesses the same information and gathering metrics from each of these layers. An embodiment may correlate the statistics with mapping information which can provide a more accurate estimated real used capacity for a volume. The mapping information may include a dependency graph, for example, a multi-level dependency graph. The dependency graph may include an end-to-end path through the plurality of layers of the multi-layered storage stack. To generate this path, an embodiment may identify which layers and abstractions access or communicate with other layers and abstractions. Each layer and abstraction may be represented as a node within the graph. The communications and paths between layers and abstractions may be represented as edges within the graph. Once all the paths have been identified, all the paths and edges that are connected to a particular node can be aggregated to get a measure of the real used capacity of the volume.

At 202 an embodiment may identify an application performance impact which may identify the impact to the performance of an application that accesses a particular volume if that volume were transitioned to a thin provisioned volume. An application may be impacted by a transition to a thin provisioned volume due to the performance difference of a thin provisioned volume compared to a thick provisioned volume. Some applications, however, may not be affected by the performance difference of the thin provisioned volume. To determine the application performance impact an embodiment may generate an input/output (I/O) profile for an application. The I/O profile may be based, in part, on the historical performance information of a volume. Once the I/O model or profile is generated, an embodiment may include using an intelligent sampling approach to estimate sparseness and cache characteristics of the volume. The I/O profile can then be updated with this information.

At 203 an embodiment may generate a volume growth profile for a candidate volume. The volume growth profile may identify a projected volume capacity usage for a future predetermined time frame. For example, the projected volume capacity may be projected for the next ninety days, the next six months, or the like. The volume growth profile may include a growth rate, which may be identified as a growth rate range. For example, an embodiment may identify that the expected growth of the volume is 10-15% of the currently used capacity. Additionally, a confidence interval may be associated with the growth rate range. For example, an embodiment may identify that the expected growth rate is 6-10% over the next three months with a confidence of 80%. The confidence may indicate how likely the growth rate is to fall within the growth rate range provided by the system.

To generate the volume growth profile an embodiment may use historical snapshotting of the capacity usage of the volume. The historical snapshotting may identify how much capacity has been used over a past time frame, which may give an indication of how much the capacity usage fluctuates over time. Historical information may not be available for every layer of the multi-level storage stack. Additionally, different layers may include historical information over different time periods. For example, one layer may store or provide historical information for the last ten days, while another layer may store or provide historical information for the last six months. Using the end-to-end layout information, as described above with respect to the multi-level dependency graph, an embodiment may stitch together the different pieces of historical information captured from each of the layers to generate a growth profile for the entire storage volume.

Referring back to FIG. 1, at 103 an embodiment may identify whether there is a benefit to transitioning at least one volume of the candidate volumes based upon the benefit identified at 102. To identify whether there is a benefit, an embodiment may run an optimization algorithm on the generated models. The optimization algorithm may be configured to maximize the amount of storage savings and minimize the risk of application performance impact. The optimization algorithm may also be configured to reduce the risk associated with a volume meeting or exceeding the currently allocated storage capacity of the volume. One type of optimization algorithm that can be used is a stochastic optimization algorithm. The optimization algorithm may then return an optimized list of actions.

In one embodiment, the system may assign different scores to each of the volumes. For example, in one embodiment the volumes may be assigned a volume savings score based upon the determined potential volume storage savings. The volume savings score may give an indication of how much storage capacity will be saved by migrating the volume to a thin provisioned volume. For example, a lower volume savings score may indicate the storage savings is low. The volumes may also be assigned a suitability score based upon the application performance impact. The suitability score may indicate how much the application will be impacted by migration of the volume to a thin provisioned volume. For example, a higher score may indicate that the application performance will be impacted very little. The volumes may also be assigned a risk score based upon the volume growth profile. The risk score may identify how likely the real used capacity will become close to the currently allocated capacity. For example, a higher risk score may designate a higher likelihood that the real used capacity of the volume may become close to the currently allocated capacity. As can be understood by one skilled in the art, the examples of what a score represents are merely examples and may be different in practice. For example, a low volume savings score may indicate the storage savings is high, rather than low. The optimization algorithm, as discussed above, may then be run using the assigned scores. Alternatively, an embodiment may simply rank the volumes based upon the assigned scores.

If an embodiment identifies no benefit to transitioning any of the candidate volumes at 103, the system may take no further action at 105. In other words, no volumes may be transitioned. The system may also provide information to a user informing the user of the lack of benefit to transitioning any of the volumes. One embodiment may also provide a user with an output which may identify the scores, ranking, list of optimized actions, and the like. The user may then overrule the system and identify the volumes which should be transitioned. If, however, an embodiment identifies a benefit to transitioning the volumes, the system may identify a subset of the candidate volumes that should be transitioned to thin provisioned volumes at 104. The subset may include only a single volume, multiple volumes, or all the candidate volumes. An embodiment may also provide the same information to the user as discussed above (e.g., scores, ranking, list of optimized actions, etc.). The system may also provide a recommendation to the user about which volumes should be transitioned. The subset may be determined based upon the optimization algorithm. For example, the optimization algorithm may be programmed to return a particular percentage of volumes. The subset may alternatively be based upon a ranking of the volumes.

Figure 3:
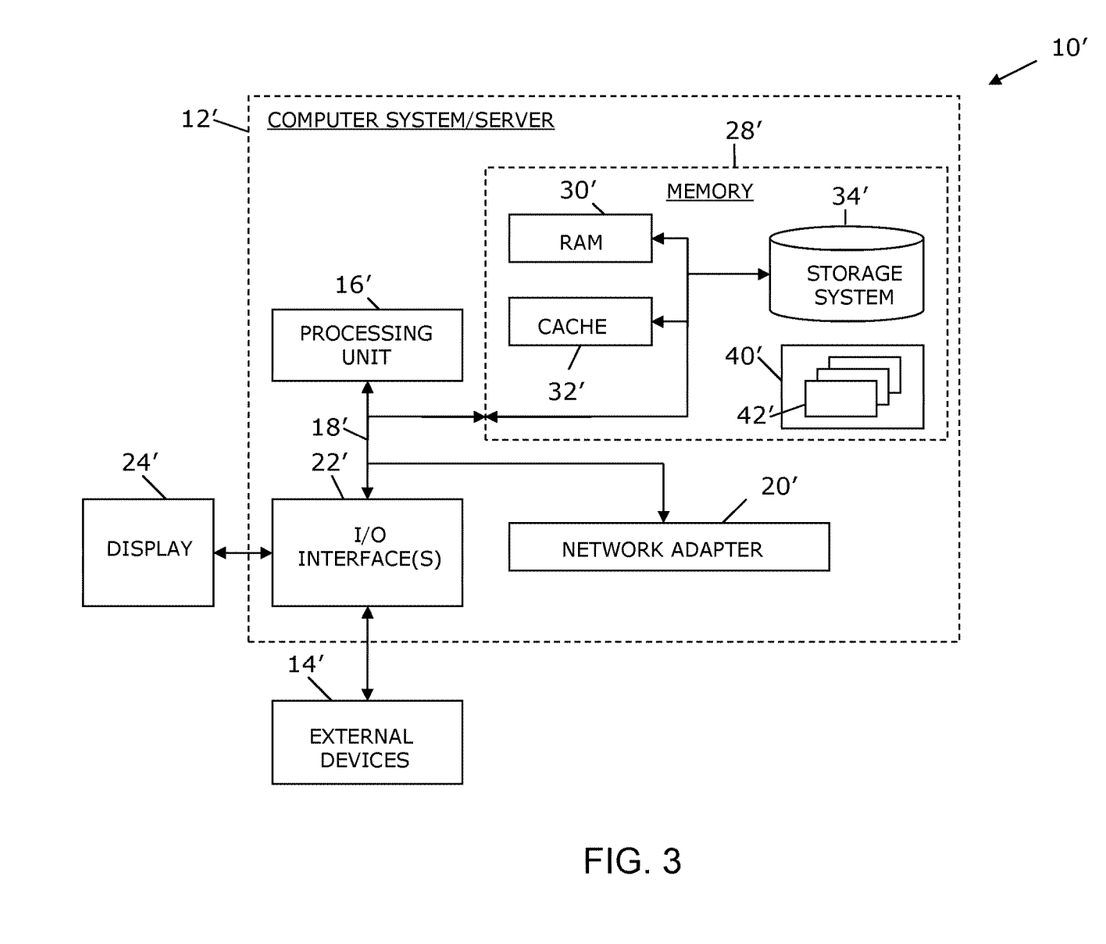
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method, comprising:
utilizing at least one processor to execute computer code that performs the steps of:
obtaining a plurality of storage volumes, wherein each of the plurality of storage volumes has been identified as a candidate for transition to a thin provisioned volume;
for each of the plurality of storage volumes, identifying a benefit associated with transitioning the volume to a thin provisioned volume;

the identifying a benefit for each of the plurality of storage volumes, comprising:

determining potential volume storage savings, wherein the potential volume storage savings identifies the amount of storage capacity that could be saved if the volume were transitioned to a thin provisioned volume;

identifying an application performance impact, wherein the application performance impact identifies an impact to the performance of an application if the volume the application accesses is transitioned to a thin provisioned volume;

generating a volume growth profile, wherein the volume growth profile identifies a projected volume capacity usage for a future predetermined time frame; and identifying, based upon the identified benefit associated with each of the plurality of storage volumes, a subset of the plurality of storage volumes to be transitioned to thin provisioned volumes, wherein the identifying a subset comprises assigning, to each of the plurality of volumes: (i) a volume savings score, based upon the determined potential volume storage savings, (ii) a suitability score, based upon the application performance impact, and (iii) a risk score, based upon the volume growth profile.

2. The method of claim 1, wherein the determining a potential volume storage savings comprises identifying a currently used capacity of the volume.

3. The method of claim 2, wherein the identifying a currently used capacity of the volume comprises obtaining capacity statistics reported by at least one layer of a multi-layered storage stack and correlating the capacity statistics to a dependency graph.

4. The method of claim 3, wherein the dependency graph comprises an end-to-end path through the multiple layers of the multi-layered storage stack for the volume.

5. The method of claim 1, wherein the identifying an application performance impact comprises generating an input/output profile for the application accessing the volume.

6. The method of claim 5, wherein the identifying an application performance impact comprises updating the input/output profile by estimating sparseness and cache characteristics of the volume.

7. The method of claim 1, wherein the generating a volume growth profile comprises utilizing historic snapshotting of the volume.

8. The method of claim 1, wherein the identifying a subset comprises using an optimization algorithm on the volume savings score, suitability score, and risk score to generate an optimized list of volumes.

9. The method of claim 1, comprising providing a recommendation, based upon the identified subset of the plurality of storage volumes, for which of the plurality of storage volumes is to be transitioned to thin provisioned volumes.

10. The method of claim 1, comprising transitioning the identified subset of the plurality of volumes to thin provisioned volumes.

11. An apparatus, comprising:
at least one processor; and
a computer readable storage medium having computer readable program code embodied therewith and executable by the at least one processor, the computer readable program code comprising:
computer readable program code that obtains a plurality of storage volumes, wherein each of the plurality of storage volumes has been identified as a candidate for transition to a thin provisioned volume;
for each of the plurality of storage volumes, computer readable program code that identifies a benefit associated with transitioning the volume to a thin provisioned volume;
the identifying a benefit for each of the plurality of storage volumes, comprising:
determining potential volume storage savings, wherein the potential volume storage savings identifies the amount of storage capacity that could be saved if the volume were transitioned to a thin provisioned volume;
identifying an application performance impact, wherein the application performance impact identifies an impact to the performance of an application if the volume the application accesses is transitioned to a thin provisioned volume;
generating a volume growth profile, wherein the volume growth profile identifies a projected volume capacity usage for a future predetermined time frame; and
computer readable program code that identifies, based upon the identified benefit associated with each of the plurality of storage volumes, a subset of the plurality of storage volumes to be transitioned to thin provisioned volumes, wherein the identifying a subset comprises assigning, to each of the plurality of volumes: (i) a volume savings score, based upon the determined potential volume storage savings, (ii) a suitability score, based upon the application performance impact, and (iii) a risk score, based upon the volume growth profile.

12. A computer program product, comprising:
a computer readable storage medium having computer readable program code embodied therewith, the computer readable program code executable by a processor and comprising:
computer readable program code that obtains a plurality of storage volumes, wherein each of the plurality of storage volumes has been identified as a candidate for transition to a thin provisioned volume;
for each of the plurality of storage volumes, computer readable program code that identifies a benefit associated with transitioning the volume to a thin provisioned volume;
the identifying a benefit for each of the plurality of storage volumes, comprising:
determining potential volume storage savings, wherein the potential volume storage savings identifies the amount of storage capacity that could be saved if the volume were transitioned to a thin provisioned volume;
identifying an application performance impact, wherein the application performance impact identifies an impact to the performance of an application if the volume the application accesses is transitioned to a thin provisioned volume;
generating a volume growth profile, wherein the volume growth profile identifies a projected volume capacity usage for a future predetermined time frame; and computer readable program code that identifies, based upon the identified benefit associated with each of the plurality of storage volumes, a subset of the plurality of storage volumes to be transitioned to thin provisioned volumes, wherein the identifying a subset comprises assigning, to each of the plurality of volumes: (i) a volume savings score, based upon the determined potential volume storage savings, (ii) a suitability score, based upon the application performance impact, and (iii) a risk score, based upon the volume growth profile.

13. The computer program product of claim 12, wherein the determining a potential volume storage savings comprises identifying a currently used capacity of the volume.

14. The computer program product of claim 13, wherein the identifying a currently used capacity of the volume comprises obtaining capacity statistics reported by at least one layer of a multi-layered storage stack and correlating the capacity statistics to a dependency graph.

15. The computer program product of claim 14, wherein the dependency graph comprises an end-to-end path through the multiple layers of the multi-layered storage stack for the volume.

16. The computer program product of claim 12, wherein the identifying an application performance impact comprises generating an input/output profile for the application accessing the volume.

17. The computer program product of claim 12, wherein the generating a volume growth profile comprises utilizing historic snapshotting of the volume.

18. The computer program product of claim 12, wherein the identifying a subset comprises using an optimization algorithm on the volume savings score, suitability score, and risk score to generate an optimized list of volumes.

\* \* \* \* \*